United States Patent
Camuffo et al.

(10) Patent No.: US 8,219,047 B2
(45) Date of Patent: Jul. 10, 2012

(54) METHODS FOR CALIBRATING A TRANSMITTER, AND RADIO TRANSMITTER

(75) Inventors: Andrea Camuffo, Munich (DE); Alexander Belitzer, Munich (DE); Andreas Langer, Unterschleissheim (DE); Gunther Kraut, Egmating (DE); Elmar Wagner, Taufkirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 626 days.

(21) Appl. No.: 12/339,155

(22) Filed: Dec. 19, 2008

(65) Prior Publication Data

US 2009/0163155 A1    Jun. 25, 2009

(30) Foreign Application Priority Data

Dec. 20, 2007 (DE) .................. 10 2007 061 453

(51) Int. Cl.
  *H04B 17/00*  (2006.01)
(52) U.S. Cl. ............ 455/127.1; 455/115.1; 455/69; 455/115.2; 455/126; 455/522
(58) Field of Classification Search ......... 455/115.4, 455/126, 127.2, 245.1, 522, 115.1, 115.3; 375/297, 298, 300.308
See application file for complete search history.

(56) References Cited

U.S. PATENT DOCUMENTS

| | | | |
|---|---|---|---|
| 5,423,082 A * | 6/1995 | Cygan et al. | 455/126 |
| 6,697,436 B1 * | 2/2004 | Wright et al. | 375/296 |
| 6,853,941 B2 * | 2/2005 | Wang et al. | 702/117 |
| 7,082,290 B2 * | 7/2006 | Takano et al. | 455/102 |
| 7,205,842 B2 * | 4/2007 | Gustavsson et al. | 330/279 |
| 7,515,884 B2 * | 4/2009 | Blech et al. | 455/127.1 |
| 7,580,723 B2 * | 8/2009 | Schwent et al. | 455/522 |
| 7,805,116 B2 * | 9/2010 | Xu et al. | 455/127.2 |
| 7,873,333 B2 * | 1/2011 | Tanaka et al. | 455/126 |
| 2001/0026579 A1 * | 10/2001 | Mollenkopf et al. | 375/141 |
| 2003/0114127 A1 * | 6/2003 | Baldwin | 455/245.1 |
| 2006/0046763 A1 * | 3/2006 | Schwent et al. | 455/522 |
| 2006/0189285 A1 * | 8/2006 | Takano et al. | 455/127.2 |
| 2006/0199552 A1 * | 9/2006 | Blech et al. | 455/127.1 |
| 2009/0088098 A1 * | 4/2009 | Xu et al. | 455/127.2 |
| 2009/0289678 A1 * | 11/2009 | Pratt et al. | 327/170 |

* cited by examiner

*Primary Examiner* — Linh Nguyen

(57) ABSTRACT

In an embodiment, a radio transmitter may be provided. The radio transmitter may include a radio transmitter control loop; and a controller configured in such a way that it operates the radio transmitter control loop as a closed control loop in a first operating mode, and that it operates the radio transmitter control loop as an open control loop in a second operating mode.

18 Claims, 9 Drawing Sheets

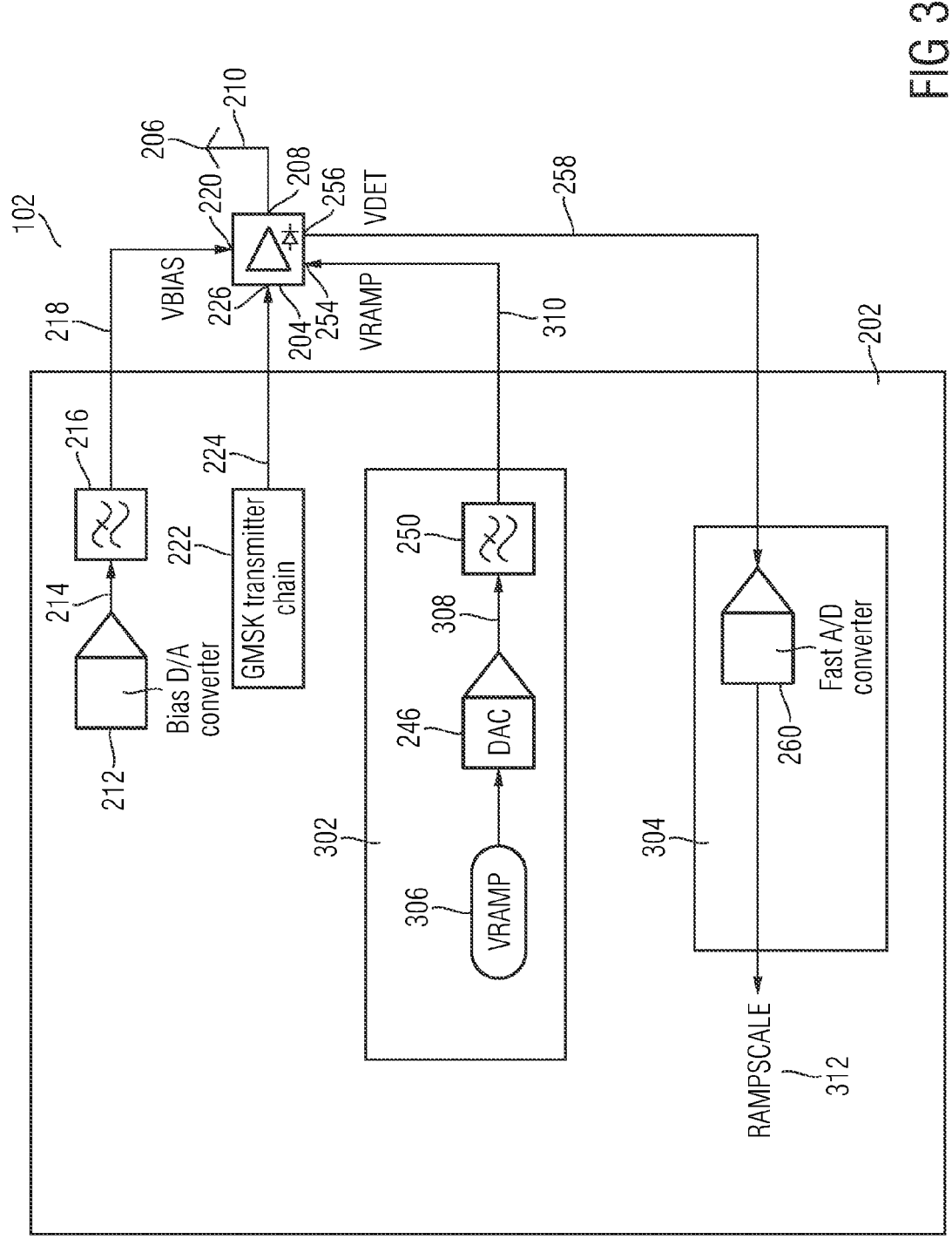

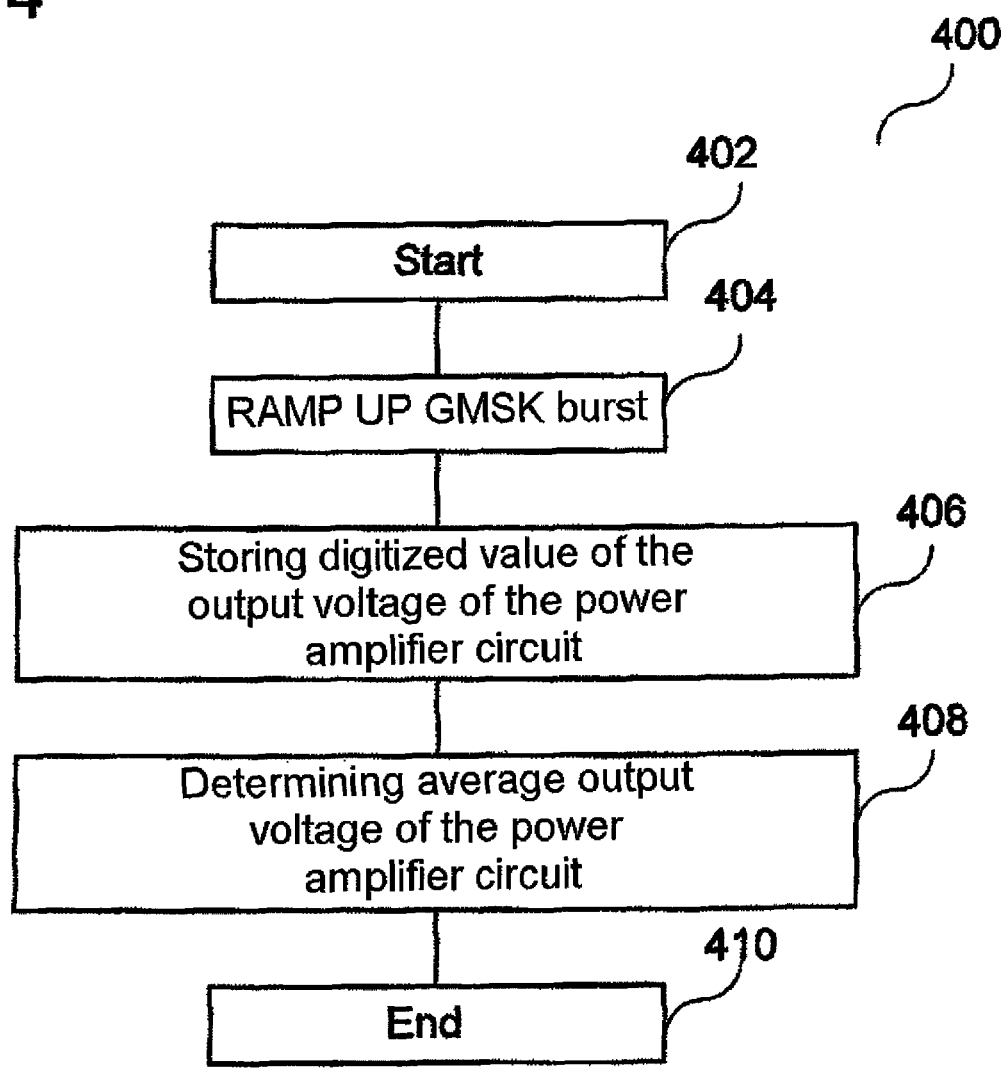

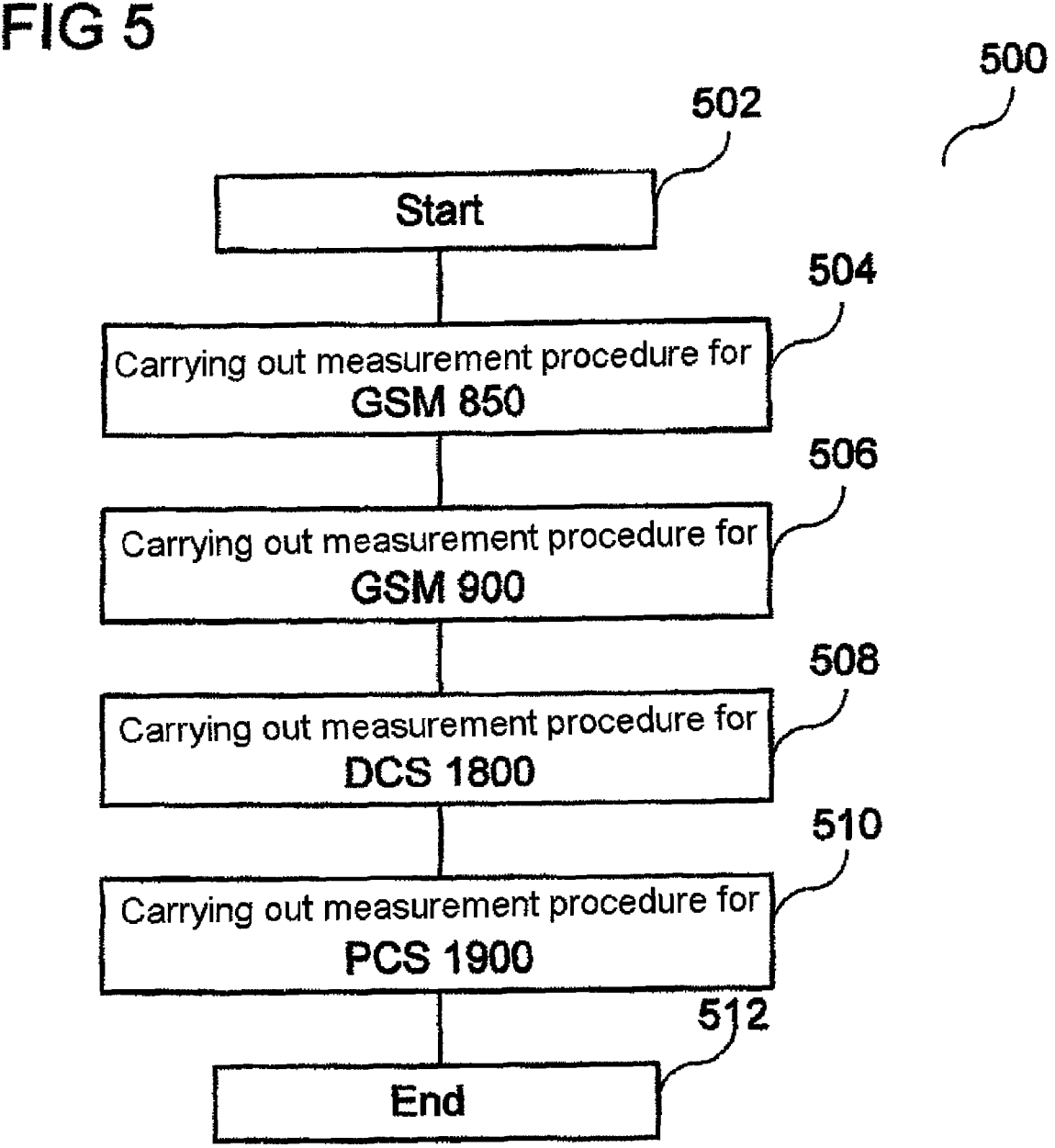

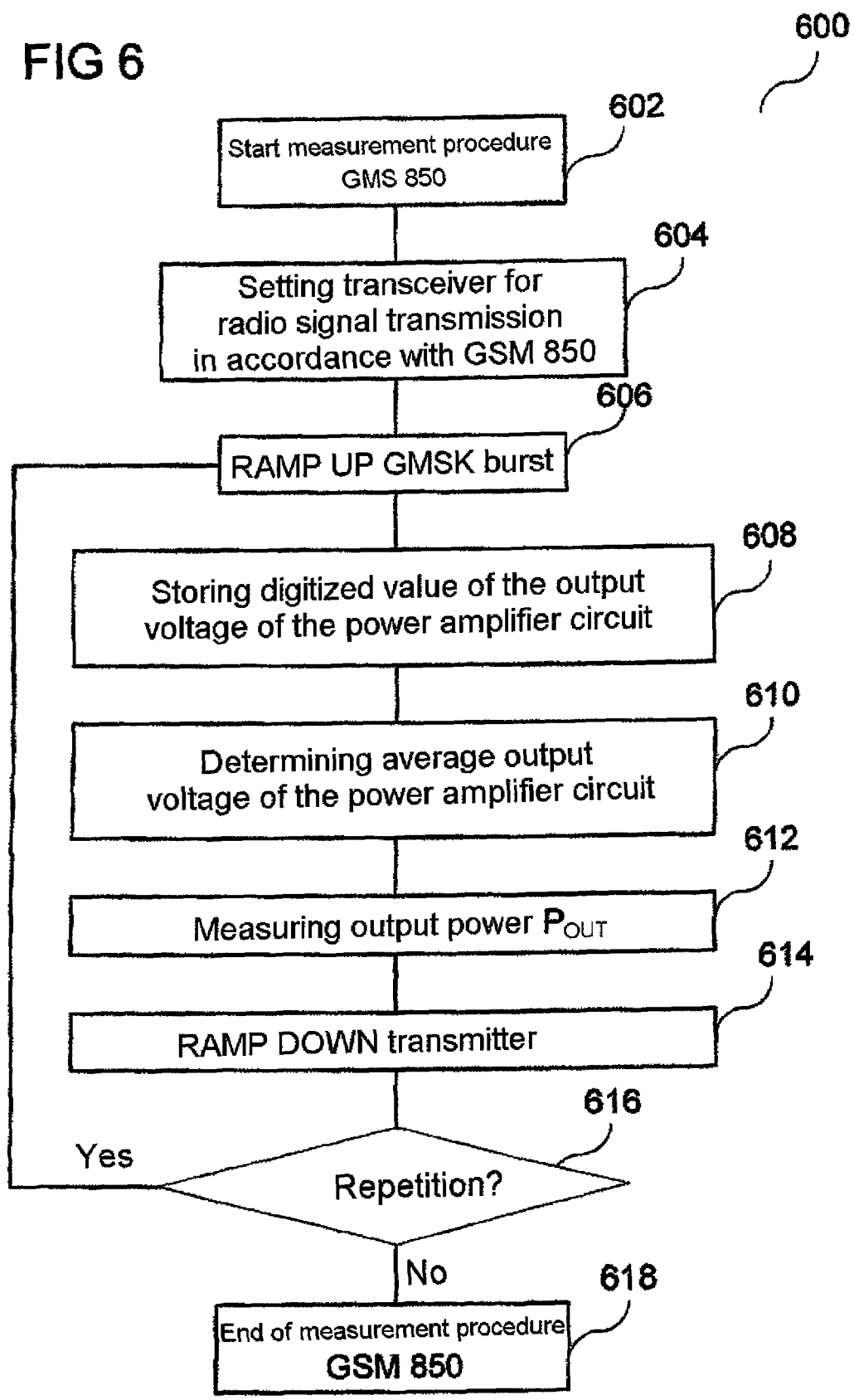

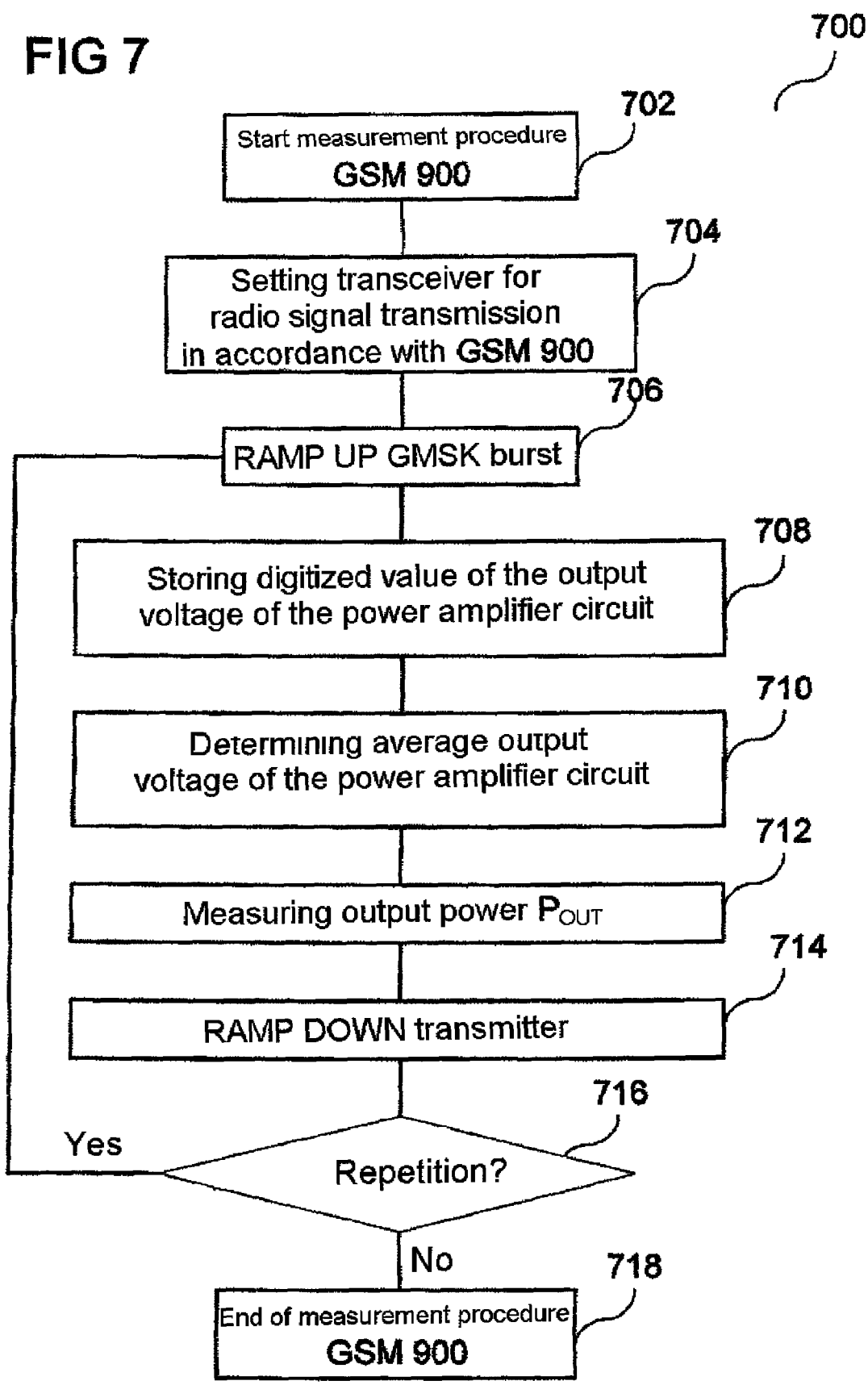

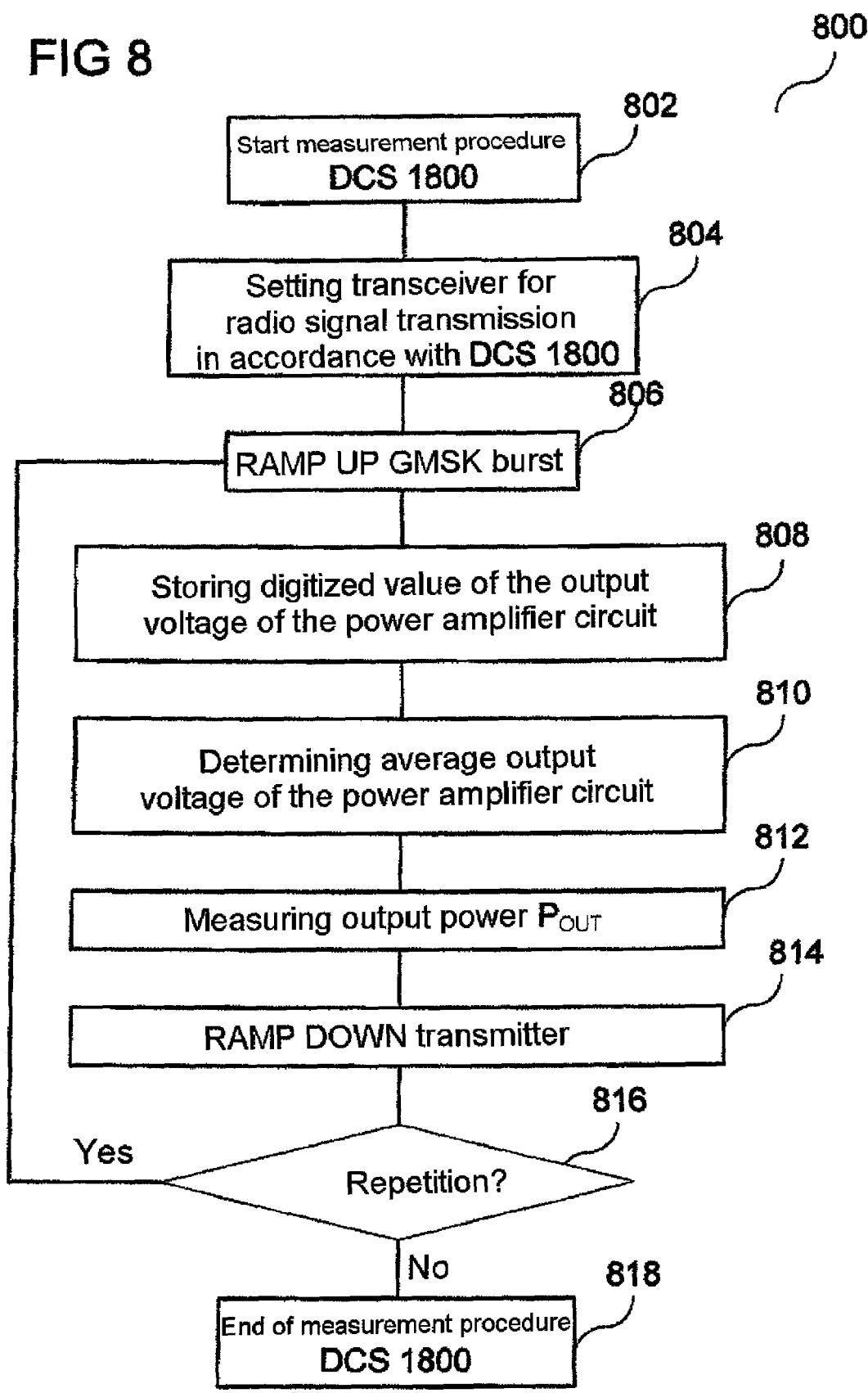

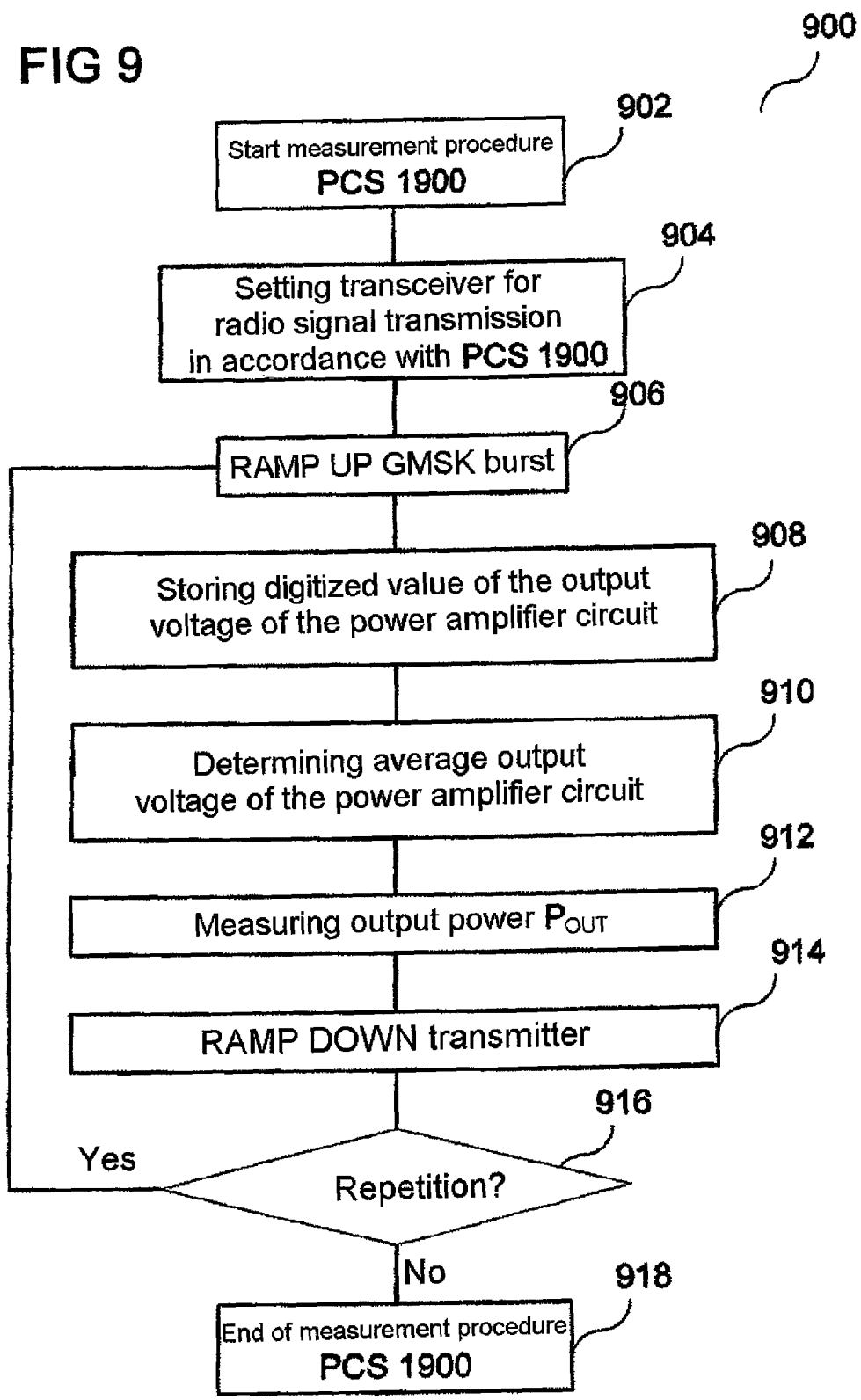

METHODS FOR CALIBRATING A TRANSMITTER, AND RADIO TRANSMITTER

CROSS-REFERENCE TO RELATED APPLICATION

This application claims priority to German Patent Application Serial No. 10 2007 061 453.7, which was filed Dec. 20, 2007, and is incorporated herein by reference in its entirety.

TECHNICAL FIELD

Embodiments relate generally to methods for calibrating a transmitter, and to a radio transmitter.

BACKGROUND

In various mobile radio communication standards, for example the Global Systems for Mobile Communications (GSM) Standard of the European Telecommunications Standards Institute (ETSI), mobile communication terminals are provided for emitting information bursts in specific radio channels with predetermined power levels. These stipulations should be complied with exactly. On the one hand, a transmitter should be switched on and switched off rapidly enough so as not to lose any time that could be utilized for some other purpose, and on the other hand, however, inadvertently transmitting radio signals on radio channels lying adjacent to the desired radio channel should be avoided.

These requirements have the effect that a transmitter should have the following properties:
 a high accuracy;
 fast switching (fast switching on and fast switching off and also fast changeover);
 a good switching profile (in order to avoid an undesired selective widening of the spectrum).

Furthermore, it should be noted that an output stage of a radio power amplifier for example in the case of GSM is sensitive with regard to a mismatch of the antenna(s). In the case of a mismatch with the antenna(s), a current of the output stage of a radio power amplifier can rise considerably depending on the phase. Such a large current brings about a large power consumption, which is of considerable importance particularly in the case of mobile devices. Under extreme conditions, the current can even be so large that the radio power amplifier is irreparably damaged. This also leads to stringent requirements made of the accuracy of the transmitter.

The transmitter is usually controlled by means of a closed control loop.

Analogue control can be used in a simple manner in the case of constant envelope modulation of the output signal, such as, for example, GMSK (Gaussian minimum shift keying, frequency shift keying with a modulation index 0.5 with a Gaussian filter connected upstream). However, it is not suitable for a modulation with a changing envelope of the output signal, such as, for example, in the case of an 8PSK modulation (8 phase shift keying).

For this reason it is desirable to use improved solutions, such as a digital control architecture, for example, which can be deactivated without glitches after an 8PSK modulation ramp-up. In some solutions, the control loop is arranged in a radio transmitter and generally controls the radio power amplifier by controlling the input power in the radio power amplifier (method for 8PSK signals), or by controlling a control voltage, usually referred to as VRAMP (a method generally used for GMSK signals). Since the properties of the radio power amplifiers in mass production vary considerably from item to item, it may be desirable to set specific parameters in order to achieve a good performance even in the case of the radio power amplifiers in the marginal region of the radio power amplifier distribution in mass production.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 3 shows a radio transmitter in accordance with one embodiment in a second operating mode;

FIG. 4 shows a flowchart illustrating a method for measuring an output voltage of a power amplifier circuit in accordance with one embodiment;

FIG. 5 shows a flowchart illustrating a method for measuring an output power of a power amplifier circuit and also a value RAMPSCALE in accordance with one embodiment;

FIG. 6 shows a flowchart illustrating a method for measuring an output power of a power amplifier circuit and also a value RAMPSCALE for GSM 850 in accordance with one embodiment;

FIG. 7 shows a flowchart illustrating a method for measuring an output power of a power amplifier circuit and also a value RAMPSCALE for GSM 900 in accordance with one embodiment;

FIG. 8 shows a flowchart illustrating a method for measuring an output power of a power amplifier circuit and also a value RAMPSCALE for DCS 1800 in accordance with one embodiment; and FIG. 9 shows a flowchart illustrating a method for measuring an output power of a power amplifier circuit and also a value RAMPSCALE for PCS 1900 in accordance with one embodiment.

DESCRIPTION

Figure 1:
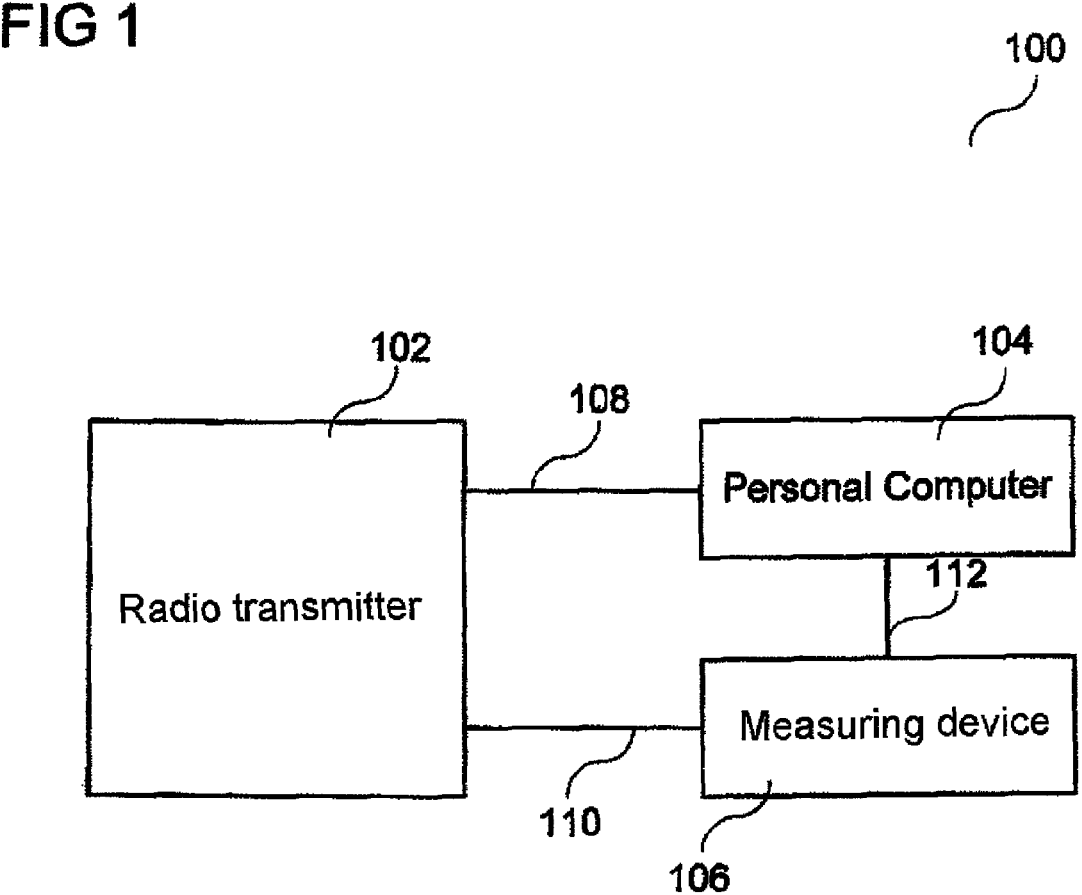
FIG. 1 shows a radio transmitter calibration arrangement in accordance with one embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

In the context of this description, the terms "connected" and "coupled" are used to describe both a direct and an indirect connection and a direct or indirect coupling. In the figures, identical or similar elements are provided with identical reference symbols insofar as this is expedient.

Various exemplary embodiments provide a power calibration method, which provide additional information about the radio power amplifier itself. It thus becomes possible for example for the calibration software to adapt some parameters in the digital control in order to obtain the best performance from the digital control, thereby improving the stability and homogeneity of the transmitter properties in the context of mass production.

One embodiment provides a method for calibrating a transmitter having a transmitter control loop. An electrical quantity is input into the transmitter. Furthermore, at least one forward path characteristic quantity of the transmitter control loop is measured which is dependent on the electrical quantity input. Furthermore, at least one backward path characteristic quantity of the transmitter control loop is measured which is dependent on the electrical quantity input. The transmitter is calibrated depending on the at least one forward path characteristic quantity measured and the at least one backward path characteristic quantity measured.

In one embodiment, the transmitter control loop may be closed during the measurement of the forward path characteristic quantity and the backward path characteristic quantity.

The measurement of the forward characteristic quantity or of a quantity related thereto can be effected by additional circuit means which provide the measured forward characteristic quantity or a quantity related thereto as measurement value during the calibration.

An alternative embodiment provides a method for calibrating a transmitter having a transmitter control loop. An electrical quantity is input into the transmitter. Furthermore, at least one forward path characteristic quantity of the transmitter control loop is measured which is dependent on the electrical quantity input. Furthermore, at least one backward Path characteristic quantity of the transmitter control loop is measured which is dependent on the electrical quantity input. The transmitter is calibrated depending on the at least one forward path characteristic quantity measured and the at least one backward path characteristic quantity measured.

The transmitter control loop may be open during the measurement of the forward path characteristic quantity and the backward path characteristic quantity.

In both cases, the forward path characteristic quantity and the backward path characteristic quantity may be measured simultaneously without, clearly, the state of the transmitter control loop changing during the calibration.

The simultaneous measurement increases the temporal efficiency of the calibration, for example.

The electrical quantity can be an electrical voltage, alternatively an electrical current from which an electrical voltage, for example, can be derived.

The electrical voltage can be a transmitter control voltage, for example an analogue transmitter control voltage.

In one configuration, the control loop is open while the measurements are carried out. In other words, no controlled variable is fed back into the control loop during the measurements. Clearly, in one configuration, an open-loop control of the transmitter, for example of an amplifier circuit of the transmitter, rather than a closed-loop control is effected during the measurements.

As an alternative or in addition, the electrical voltage can be a transmitter control loop target control voltage.

In this configuration, for example, the control loop can be closed while the measurements are carried out.

In another configuration, the transmitter may have an amplifier circuit configured to amplify a transmission signal to be transmitted. In this case, in the method, the electrical quantity may be fed to the amplifier circuit, and a quantity representing an output power of the amplifier circuit may be measured as the forward path characteristic quantity.

In yet another configuration, the transmitter may have an amplifier circuit configured to amplify a transmission signal to be transmitted. In this configuration, the electrical quantity may be fed to the amplifier circuit, and a quantity representing a transmitter control loop target control voltage of the amplifier circuit may be measured as the backward path characteristic quantity.

In yet another configuration, the transmitter may have an amplifier circuit configured to amplify a transmission signal to be transmitted. In this configuration, the electrical quantity may be fed to the amplifier circuit, and a quantity representing a transmitter control loop response threshold voltage of the amplifier circuit may be measured as the backward path characteristic quantity.

In accordance with one configuration, the electrical quantity can be derived from a digital value which is input and which represents the electrical quantity.

In yet another configuration, the measured backward path characteristic quantity of the transmitter control loop can be digitized to form a digital backward path characteristic quantity of the transmitter control loop.

The transmitter can be a mobile radio transmitter, for example. Consequently, the transmitter may be integrated for example in a communication device, for example in a communication terminal, for example in a mobile radio communication terminal.

In various embodiments, the communication device (for example the communication terminal) and thus the radio transmitter may be configured in accordance with a wireless communication standard, for example in accordance with one of the following wireless communication standards:

Digital Enhanced Cordless Telecommunication (DECT);
Wideband Digital Enhanced Cordless Telecommunication (WDECT);
Cordless Telephony 2 (CT2);
Cordless Advanced Technology—internet and quality (CAT-iq).

In various embodiments, the communication device (for example the communication terminal) and thus the radio transmitter may be configured in accordance with a mobile radio communication standard, for example in accordance with a Third Generation Partnership Project (3GPP) communication standard, for example in accordance with one of the following mobile radio communication standards:

Global Systems for Mobile Communications (GSM);
Universal Mobile Telecommunication System (UMTS);
Long Term Evolution (LTE);
Code Division Multiple Access 2000 (CDMA2000);
Freedom of Mobile Multimedia Access (FOMA).

Another embodiment provides a method for calibrating an electronic circuit having a transmitter control loop. An electrical quantity is input into the electronic circuit. Furthermore, at least one forward path characteristic variable of the control loop is measured which is dependent on the electrical quantity input. Furthermore, at least one, backward path characteristic quantity of the control loop is measured which is dependent on the electrical quantity input. The electronic circuit is calibrated depending on the at least one forward path characteristic quantity measured and the at least one backward path characteristic quantity measured.

In accordance with this embodiment, the electrical quantity may be an electrical voltage, alternatively for example an electrical current from which an electrical voltage can be derived.

The electrical voltage may be a transmitter control voltage, for example an analogue transmitter control voltage.

In one configuration, the control loop is open while the measurements are carried out. In other words, no controlled variable is fed back into the control loop during the measurements. Clearly, in one configuration, an open-loop control of the transmitter, for example of an amplified circuit of the transmitter, rather than a closed-loop control is effected during the measurements.

As an alternative or in addition, the electrical voltage may be a transmitter control loop target control voltage.

In this configuration, for example, the control loop can be closed while the measurements are carried out.

In another configuration, the electronic circuit may have an amplifier circuit configured to amplify a transmission signal to be transmitted. In this case, in the method, the electrical quantity may be fed to the amplifier circuit, and a quantity representing an output power of the amplifier circuit is measured as the forward path characteristic quantity.

In yet another configuration, the electronic circuit may have an amplifier circuit configured to amplify a transmission signal to be transmitted. In this configuration, the electrical quantity may be fed to the amplifier circuit, and a quantity representing a control loop target control voltage of the amplifier circuit may be measured as the backward path characteristic quantity.

In yet another configuration, the electronic circuit may have an amplifier circuit configured to amplify a transmission signal to be transmitted. In this configuration, the electrical quantity may be fed to the amplifier circuit, and a quantity representing a control loop response threshold voltage of the amplifier circuit may be measured as the backward path characteristic quantity.

In accordance with one configuration, the electrical quantity may be derived from a digital value which is input and which represents the electrical quantity.

In yet another configuration, the measured backward path characteristic quantity of the transmitter control loop may be digitized to form a digital backward path characteristic quantity of the transmitter control loop.

In yet another embodiment, a radio transmitter is provided. The radio transmitter may have a radio transmitter control loop and also a controller configured in such a way that it operates the radio transmitter control loop as a closed control loop in a first operating mode, and that it operates the radio transmitter control loop as an open control loop in a second operating mode.

The second operating mode can be a calibration mode for calibrating the radio transmitter.

In accordance with another configuration, an amplifier circuit may additionally be provided for amplifying a radio signal to be transmitted.

In accordance with yet another configuration, a modulator may additionally be provided, wherein the modulator may be connected to a first input of the amplifier circuit, such that the modulated radio signal to be transmitted may be fed to the amplifier circuit.

In accordance with yet another configuration, an operating point setting circuit may additionally be provided for providing a quantity that determines an operating point of the amplifier circuit, wherein the operating point setting circuit may be connected to a second input of the amplifier circuit, such that the quantity that determines the operating point of the amplifier circuit may be fed to the amplifier circuit.

In accordance with yet another configuration, the radio transmitter control loop may have a forward path. The forward path may have a digital/analogue converter, the input of which is configured to receive a digital value representing a radio transmitter control voltage, wherein the radio transmitter control voltage is provided at an output of the digital/analogue converter. The output of the digital/analogue converter may be connected to a third input of the amplifier circuit, such that the radio transmitter control voltage may be fed to the amplifier circuit.

In accordance with yet another configuration, a ramp voltage value generator may additionally be provided for generating a ramp voltage value for the opened or closed loop control of the radio transmitter.

A first output of the ramp voltage generator may be connected to the input of the digital/analogue converter, such that the ramp voltage value may be received as the digital value by the digital/analogue converter.

Furthermore, the radio transmitter control loop may have a backward path. The backward path may have an analogue/digital converter, the input of which is connected to an output of the amplifier circuit and which is configured to receive an output voltage of the amplifier circuit, wherein a digitized output voltage of the amplifier circuit is provided at an output of the analogue/digital converter.

The output of the analogue/digital converter may be connected to an input of the controller, such that the digitized output voltage of the amplifier circuit may be fed to the controller.

In accordance with another configuration, a second output of the ramp voltage value generator is connected to the input of the controller, such that a quantity representing the ramp voltage value may be received by the controller.

In one development, the controller may include a sequence controller.

It should be pointed out in this connection that the controller may be a hardwired logic, alternatively a programmable logic, for example a programmable processor such as a microprocessor, for example.

In accordance with yet another configuration, a memory configured to store at least one calibration value determined in the second operating mode may additionally be provided.

As an alternative or in addition, a memory configured to store at least one calibration value of the amplifier circuit which is determined in the second operating mode may be provided. A common memory for example a nonvolatile memory, for example a flash memory, may be provided for storing both quantities mentioned above. The radio transmitter may be a mobile radio transmitter.

In accordance with another configuration, a communication device (for example a communication terminal, for example a radio communication terminal, for example a mobile radio communication terminal) including a radio transmitter described above is provided.

FIG. 1 shows a radio transmitter calibration arrangement 100 in accordance with one embodiment.

In this embodiment, the radio transmitter calibration arrangement 100 is provided with a radio transmitter 102 to be calibrated, and also a computer 104, for example a personal computer, for radio-transmitter-external control of the calibration operation, and one or more measuring devices 106. The at least one measuring device 106 may be a power measuring device and/or a communication device test device (for example the measuring device CMU 200 from Rohde und Schwarz). In alternative configurations of the radio transmitter calibration arrangement it is also possible to use other measuring devices which can be used to measure electrical quantities such as, for example, an electrical voltage and/or an electrical current and/or an electrical power.

In one embodiment of the radio transmitter calibration arrangement 100, the radio transmitter 102 is connected to the computer 104 for example by means of a first communication connection (wire-based or wireless) 108. Furthermore, the radio transmitter 102 may be connected to the at least one measuring device 106 for example by means of a second communication connection (wire-based or wireless) 110. Moreover, the computer 104 may be connected to the at least one measuring device 106 for example by means of a third communication connection (wire-based or wireless) 112, for example for controlling the respective measurement operations in the radio transmitter 102 and for evaluating the measured quantities which may be transmitted from the at least one measuring device 106 to the computer 104 by means of the third communication connection 112.

Figure 2:
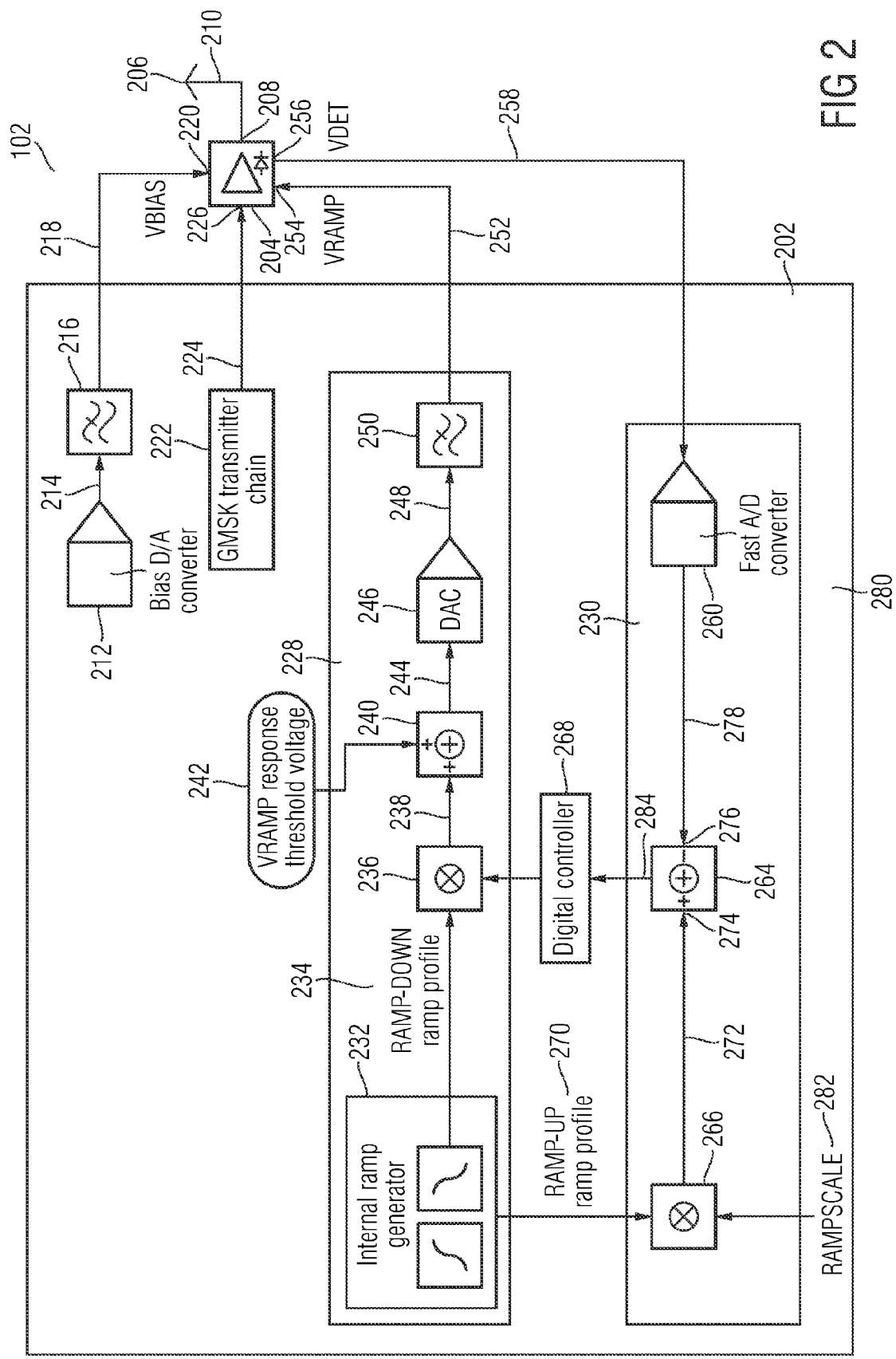
FIG. 2 shows a radio transmitter in accordance with one embodiment in a first operating mode.

FIG. 2 shows an embodiment of the radio transmitter 102 in a first operating mode in greater detail.

In one embodiment, the first operating mode is an operating mode in which the radio transmitter 102 is operated with a closed control loop.

The radio transmitter 102 has a transmitter chip 202, and also a power amplifier circuit 204 and an antenna 206. The antenna 206 is connected to a first output 208 of the power amplifier circuit 204, at which the radio transmission signal 210 to be emitted is provided.

The transmitter chip 202 may include a plurality of different components, for example a bias voltage digital/analogue converter 212, which provides an electrical bias voltage 214 which determines an operating point of the power amplifier circuit 204, said bias voltage being fed to a first filter 216, for example a first low-pass filter 216.

The filtered bias voltage 218 is applied to a first input 220 (also referred to hereinafter as operating point input 220) of the power amplifier circuit 204.

Furthermore, in one embodiment of the radio transmitter, the transmitter chip 202 has a GMSK transmitter chain 222 having the components (for example one or more modulators) usually provided for a GMSK modulation (Gaussian minimum shift keying, frequency shift keying with a modulation index of 0.5 with a Gaussian filter connected upstream). It should be pointed out that in an alternative embodiment of the radio transmitter, any other desired and suitable type of modulation and hence corresponding components may be provided, for example a frequency modulation, an amplitude modulation, a phase modulation or a combination of the aforementioned modulations or some other suitable modulation. A radio signal 224 that is generated by the GMSK transmitter chain 222 and is to be transmitted may be applied to a second input 226 of the power amplifier circuit 204 and may be fed to the latter via said input.

Furthermore, the transmitter chip 202 may have a control loop for closed loop control or open loop control of the control voltage of the power amplifier circuit 204. In the first operating mode, for example, the control loop has a closed control loop with a forward path 228 and a backward path 230. Furthermore, the control loop may also contain a digital controller 268, for example realized as a hardwired sequence controller (alternatively as a programmable controller, for example as a programmable microprocessor).

In one embodiment, the forward path 228 may have a transmitter-chip-internal ramp signal generator 232, which can provide different ramp signal profiles, for example depending on the respective mobile radio communication standard and the frequency band respectively chosen for signal transmission, as will be explained in greater detail below.

In one embodiment of the radio transmitter, the ramp signal generator 232 generates a ramp-down ramp signal profile (ramp-down profile) 234 and provides it at a first output of the ramp signal generator 232. The ramp-down ramp signal profile 234 may be fed to a first input of a first multiplier 236, at the second input of which a desired voltage generated by the digital controller 268 is provided. The product signal 238 generated from these two input signals by the first multiplier 236 may be fed to a first input of a first adder 240, at the second input of which a predetermined control loop response threshold voltage 242 may be fed in. The summation voltage generated by the first adder 240 is provided as summation signal 244 at an output of the first adder 240 and fed to a digital/analogue converter 246 connected thereto, which converter converts the digital summation signal 244 into an analogue summation signal 248 and provides the latter at an output. The analogue summation signal 248 may be fed to a second filter 250, for example a second low-pass filter 250, connected to the output of the digital/analogue converter 246.

The filtered analogue summation signal 252 clearly represents the control voltage of the power amplifier circuit 204 and may be fed to the latter at a third input 254 of the power amplifier circuit 204 (also referred to hereinafter as control voltage input 254).

Consequently, in one embodiment of the radio transmitter, the forward path 228 has the following components, inter alia: a transmitter-chip-internal ramp signal generator 232, the first multiplier 236, the first adder 240, the digital/analogue converter 246, and also the second filter 250.

In one embodiment of the radio transmitter, the backward path 230 has a fast analogue/digital converter 260, the input of which is connected to a second output 256 of the power amplifier circuit 204, at which an output voltage $V_{DET}$ 258 generated by the power amplifier circuit 204 is provided. In the second operating mode, the measuring device 106 may be coupled to the first output 208 of the power amplifier circuit 204 for measuring the generated output power $P_{OUT}$ of the power amplifier circuit 204.

A subtractor 264 and a second multiplier 266 are furthermore provided in the backward path 230.

In one embodiment of the radio transmitter, the ramp signal generator 232 generates a ramp-up ramp signal profile (ramp-up profile) 270 and provides it at a second output of the ramp signal generator 232. The ramp-up ramp signal profile 270 is fed to a first input of the second multiplier 266, at the second input of which a ramp scaling signal RAMPSCALE 282 is provided. In one embodiment, the ramp scaling signal RAMPSCALE 282 is a digital control word (for example having a word width of 8 bits) and represents the desired value of the output power of the power amplifier circuit 204. The further product signal 272 generated from these two input signals by the second multiplier 266 may be fed to a first input 274 of the subtractor 264 as a minuend signal, wherein the digitized signal 278 of the output voltage $V_{DET}$ of the power amplifier circuit 204, said digitized signal being generated by the fast analogue/digital converter 260, is applied to the second input 276 of the subtractor 264 as a subtrahend signal. The difference signal formed by the subtractor 264 from the further product signal 272 and the digitized signal 278 of the output voltage $V_{DET}$ of the power amplifier circuit 204 may be fed to an input of the digital controller 268 that is coupled to an output of the subtractor 264.

The control loop for closed loop control of the power amplifier circuit 204 is thus closed.

FIG. 3 shows an embodiment of the radio transmitter 102 in a second operating mode in greater detail.

In one embodiment of the radio transmitter, the second operating mode is a calibration mode in which the radio transmitter 102, and in this case for example the power amplifier circuit 204 thereof, is calibrated. This calibration of the radio transmitter 102 (for example of the transmission power levels) is provided for example in order to ensure that the radio transmitter 102 always transmits with the correct output power. Since the output power is controlled in the first operating mode in a closed control loop by means of an automatic power control, APC), for example the transmission power level calibration is provided for determining the correct operating points for the power control and for calculating some other parameters useful for operation of the radio transmitter 102 in the first operating mode (with the closed control loop).

In the second operating mode, the radio transmitter 102 is operated in such a way that the control loop is open, to put it another way there is for example no feedback of the output voltage $V_{DET}$ of the power amplifier circuit 204 into the control loop for controlling the power amplifier circuit 204.

The second operating mode may be set for example by means of the digital controller 268 illustrated in FIG. 2, for example using an operating mode selection register in which an indication of the operating mode to be used for the radio transmitter 102 may be stored, which is interrogated by the digital controller 268 (for example a sequence controller) and is used for deciding whether the radio transmitter 102 is to be operated in the first operating mode or in the second operating mode (for example in a calibration mode) by the digital controller 268.

In the second operating mode, the forward path 302 has for example only the digital/analogue converter 246 and the second filter 250, for example the second low-pass filter 250, connected to the output of the digital/analogue converter 246. In this embodiment, a digital target control voltage value VRAMP 306 representing a target control voltage of the power amplifier circuit 204 may be input into the digital/analogue converter 246 and converted therein to an analogue target control voltage 308 of the power amplifier circuit 204. The analogue target control voltage 308 of the power amplifier circuit 204 in turn may be fed to the second filter 250, for example the second low-pass filter 250, which provides a filtered analogue target control voltage 310 of the power amplifier circuit 204 and feeds it to the third input 254 of the power amplifier circuit 204.

The transmission power $P_{OUT}$ thereupon provided at the first output 208 of the power amplifier circuit 204 is measured by means of the measuring device 106. The measured transmission power $P_{OUT}$ is an example of a forward path characteristic quantity of the control loop of the radio transmitter 102.

Furthermore, in the same measurement (alternatively in a different measurement, which is carried out, however, upon application of the same digital target control voltage value VRAMP 306), at least one further parameter (to put it another way a different quantity) is measured, for example the output voltage $V_{DET}$ 258 of the power amplifier circuit 204 that is provided at the second output 256 of the power amplifier circuit 204 and/or the value of said output voltage digitized by means of the fast analogue/digital converter 260, which value represents the ramp scaling signal RAMPSCALE 312. Furthermore, as will be explained in more detail below, as an alternative or in addition a respective control loop gain value KLOOP_G may be determined in the second operating mode. Moreover, as an alternative or in addition, a respective response threshold voltage may be determined in the second operating mode, this voltage being required in order actually to bring about a respectively sufficient signal gain in the power amplifier circuit 204. The respective response threshold voltage may be fed to the second input of the first adder 240 in the first operating mode. The output voltage $V_{DET}$ 258 of the power amplifier circuit 204 and/or its value digitized by means of the fast analogue/digital converter 260, said value representing the ramp scaling signal RAMPSCALE 312, the control loop gain value KLOOP_G and also the respective response threshold voltage for examples of a backward path characteristic quantity of the control loop of the radio transmitter 102.

From the measured quantities it is possible to determine various characteristic curves, for example various forward path characteristic quantity/backward path characteristic quantity characteristic curves. In one embodiment, a characteristic curve may be determined (for example by the computer 104) which describes the relationship between the digital target control voltage value VRAMP 306 and the digitized value representing the ramp scaling signal RAMPSCALE 312. The control loop gain value KLOOP_G may then also be determined from this, for example. This may all be determined without requiring additional measurements compared with the determination of the output power $P_{OUT}$ of the power amplifier circuit 204.

In one embodiment, a baseband chip (not illustrated) programs the value of the ramp scaling signal RAMPSCALE 282 of the control of the closed control loop (in the first operating mode of the radio transmitter 102). In one embodiment, the ramp scaling signal RAMPSCALE 282 is a digital control word (for example having a predeterminable word width, for example having the word width of eight bits) and represents the desired value of the output power of the power amplifier circuit 204.

In one embodiment the fast analogue/digital converter 260, in the first operating mode, converts the analogue output voltage $V_{DET}$ 258 of the power amplifier circuit 204 into a digital value (for example into a digital word having a plurality of bits (for example into an eight-bit word)). The digitized value of the output voltage $V_{DET}$ 258 of the power amplifier circuit 204 may then be compared with the ramp scaling signal RAMPSCALE 282 by means of the subtractor 264 and the digital controller 268. During the calibration (generally in the second operating mode of the radio transmitter 102), the respectively digitized value of the output voltage $V_{DET}$ 258 of the power amplifier circuit 204 may be buffer-stored (and repeatedly updated) in a register and be temporally successively repeatedly read out. From the plurality (for example seven) of the register values which are read out and which represent the digitized values of the output voltage $V_{DET}$ 258 of the power amplifier circuit 204 that are generated by the fast analogue/digital converter 260 at the respective point in time, in one embodiment optionally the statistical average value may be determined and may be used as the final digitized value of the output voltage $V_{DET}$ 258 of the power amplifier circuit 204. The noise during the detection of the output voltage $V_{DET}$ 258 of the power amplifier circuit 204 may be reduced in this way.

It should be pointed out that, in one embodiment, the values determined in the context of the measurement and calibration of the radio transmitter in the transmission mode in accordance with GMSK may also be used again for the determination of the corresponding values for the transmission mode in accordance with 8PSK. Consequently, in accordance with this embodiment, it is not necessary to carry out an additional power amplifier circuit calibration for the transmission mode in accordance with 8PSK. This may lead to a considerable reduction in the context of the production of the radio transmitter 102. In the transmission mode in accordance with 8PSK, the ramping up is effected using "1" symbols, which leads to a virtually constant envelope (for example with an amplitude fluctuation of less than 0.3 dB).

In one exemplary embodiment, the measurement procedure in the context of the calibration of the transmission power level may include the following two measurements:

a first measurement of the control loop response threshold voltage $V_{DET\_PED}$ of the power amplifier circuit 204; and a second measurement of the values VRAMP vs. $P_{OUT}$ vs. RAMPSCALE.

It is assumed for all the calibration steps in this example that the radio transmitter has been switched on and that it is in acquiescent state.

Additionally, the control loop response threshold voltage $V_{DET\_PED}$ of the power amplifier circuit 204 is measured in a first measurement.

The first measurement is illustrated in a flowchart 400 in FIG. 4.

A small output offset voltage is usually present at the second output 256 of the power amplifier circuit 204 even if no radio output power is present. The output offset voltage is defined as a DC voltage that can be measured at the second output 256 of the power amplifier circuit 204 if the radio input signals to be transmitted are applied. The output offset voltage depends for example on the temperature and the voltage supplied. The total output voltage $V_{DET}$ of the power amplifier circuit 204 results from the sum of the output offset voltage and the actually desired (useful) DC voltage, which is dependent on the desired transmission power.

In order to ensure that the automatic power control functions very well, in one embodiment it is provided for the variation of the output offset voltage to be compensated for. If the output offset voltage were greater than the voltage represented by the RAMPSCALE value, then the automatic power control would possibly not start. This can occur at a low output power level, for example, if the output offset voltage increases on account of the temperature and becomes greater than the calibrated RAMPSCALE value.

In order to overcome this effect, the output offset voltage (to put it another way the control loop response threshold voltage) may be measured during production in the factory. The measurement is carried out by the radio transmitter in the same way as the measurement of the RAMPSCALE value for the power calibration. One difference, however, is that for this measurement the output power of the power amplifier circuit 204 lies below the dynamic range of the analogue/digital converter 260.

After the method 400 has been started in 402, a GMSK burst is ramped up without output power in 404. The digitized value of the output voltage of the power amplifier circuit 204 as determined by the analogue/digital converter 260 is then buffer-stored in an output voltage register in 406.

In one embodiment, at a predetermined time interval (which should be large enough such that the analogue/digital converter 260 may determine a change in the output voltage and buffer-store it in the output voltage register), the output voltage register may be read repeatedly and a statistical average value of the values read out from the output voltage register may be determined as average output voltage of the power amplifier circuit 204 in 408.

This method may be carried out for each frequency band that is supported by the radio transmitter 102.

The method may be subsequently ended in 410.

The calibration described below is effected in the operating mode with an open control loop at the highest bias voltage level of the power amplifier circuit 204.

In the operating mode with an open control loop, the power amplifier circuit 204 is directly controlled by the digital target control voltage value VRAMP 306. One embodiment provides for carrying out a multiplicity of measurements (in particular seven, generally any desired number) over a predetermined output power range for determining the detector characteristic. If a CMU 200 is used as measuring device 106 with the fast measurement option K47, then the seven measurements may be carried out in a single frame. The best digital target control voltage values VRAMP 306 may be determined during the production and development of the radio transmitter 102.

The following values are used or measured for the second measurement:

an output power $P_{OUT}$ of the power amplifier circuit 204, measured for example at an antenna connection of the radio transmitter 102 or of a communication device, for example mobile communication terminal, provided with a radio transmitter;

a digital target control voltage value VRAMP 306;

a ramp scaling signal RAMPSCALE 312.

For each output power level used for calibration, the digital target control voltage value VRAMP 306 may be programmed into the transmitter chain 222, which then may transmit with a specific transmission power to be measured. Furthermore, the output voltage of the power amplifier circuit 204 that is provided by the analogue/digital converter 260 and buffer-stored is read out as ramp scaling signal RAMP-SCALE 312 from a register (for example from a register of the radio transmitter) in each of the seven time slots provided. In the first operating mode, the value RAMPSCALE may represent the desired value of the output power. Consequently, the value RAMPSCALE may not only set the desired value of the output power but also may represent the measured digitized output voltage of the power amplifier circuit 204 in the second operating mode (e.g. in the context of the calibration).

The following measured value table thus results:

| VRAMP (digital value) | $P_{OUT}$ (dBm) | Value in output voltage register |
|---|---|---|
| VRAMP1 | $P_{OUT}1$ | RAMPSCALE1 |
| VRAMP2 | $P_{OUT}2$ | RAMPSCALE2 |
| VRAMP3 | $P_{OUT}3$ | RAMPSCALE3 |
| VRAMP4 | $P_{OUT}4$ | RAMPSCALE4 |
| VRAMP5 | $P_{OUT}5$ | RAMPSCALE5 |
| VRAMP6 | $P_{OUT}6$ | RAMPSCALE6 |
| VRAMP7 | $P_{OUT}7$ | RAMPSCALE7 |

The mapping of (predetermined) values VRAMP onto corresponding (measured) values of the output power $P_{OUT}$ of the power amplifier circuit 204 may represent a characterization of the forward path 302. Furthermore, the mapping of values of the output power $P_{OUT}$ of the power amplifier circuit 204 onto corresponding (measured) values of RAMPSCALE may represent a characterization of the backward path 304.

Although the output power is slightly frequency-dependent, in one embodiment the measurements need only be carried out once, for example in the center of the respective frequency band, since the variation over the frequency band should be sufficiently small.

In one embodiment of the radio transmitter 102, the latter is configured in such a way that it supports the following mobile radio communication standards and thus transmission in the associated frequency bands:

Global Systems for Mobile Communications (GSM) 850;
Global Systems for Mobile Communications (GSM) 900;
Digital Communication System (DCS) 1800;
Personal Communication System (PCS) 1900.

One embodiment provides for the above-described, for example seven, measurements to be carried out in each of the above frequency bands in each case in the center of the frequency band.

Since seven measurements may be carried out in a GSM frame, the total time for the abovementioned measurements amounts to four frames or 18.5 ms.

For each of these measurement points, the value of the output power $P_{OUT}$ and the resulting value RAMPSCALE may be stored for subsequent calculations. 28 values of the output power $P_{OUT}$ and 28 values of RAMPSCALE may thus be stored.

In one embodiment, a measured value table is determined for each frequency band. One example of such an overall measured value table is presented below:

| Step number | Band | VRAMP value |
| --- | --- | --- |
| 1 | GSM850 | 600 |
| 2 | GSM850 | 400 |
| 3 | GSM850 | 210 |
| 4 | GSM850 | 150 |
| 5 | GSM850 | 120 |
| 6 | GSM850 | 105 |
| 7 | GSM850 | 90 |
| 1 | GSM900 | 590 |
| 2 | GSM900 | 410 |
| 3 | GSM900 | 215 |
| 4 | GSM900 | 153 |
| 5 | GSM900 | 122 |
| 6 | GSM900 | 106 |
| 7 | GSM900 | 85 |
| 1 | DCS1800 | 623 |
| 2 | DCS1800 | 398 |
| 3 | DCS1800 | 201 |
| 4 | DCS1800 | 153 |
| 5 | DCS1800 | 128 |
| 6 | DCS1800 | 103 |
| 7 | DCS1800 | 93 |
| 1 | PCS1900 | 595 |
| 2 | PCS1900 | 404 |
| 3 | PCS1900 | 216 |
| 4 | PCS1900 | 148 |
| 5 | PCS1900 | 126 |
| 6 | PCS1900 | 101 |
| 7 | PCS1900 | 82 |

It should be noted in this connection that the table is dependent on the respective power amplifier circuit 204, for which reason, in one embodiment, different tables are determined for different power amplifier circuits 204. It should be pointed out that the table above is merely an example and the values for a power amplifier circuit 204 can deviate considerably.

FIG. 5 shows a flowchart 500 illustrating a method for measuring an output power $P_{OUT}$ of a power amplifier circuit 204 and also a value RAMPSCALE in accordance with one embodiment.

After the measurement procedure has been started in 502, the measurement procedure for measuring values of the output power $P_{OUT}$ of the power amplifier circuit 204 and also values of RAMPSCALE in accordance with GSM 850 may be carried out in 504. A measurement procedure for measuring values of the output power $P_{OUT}$ of the power amplifier circuit 204 and also values of RAMPSCALE in accordance with GSM 900 may then be carried out in 506. Afterward, a measurement procedure for measuring values of the output power $P_{OUT}$ of the power amplifier circuit 204 and also values of RAMPSCALE in accordance with DCS 1800 may be carried out in 508. Finally, a measurement procedure for measuring values of the output power $P_{OUT}$ of the power amplifier circuit 204 and also values of RAMPSCALE in accordance with PCS 1900 may be carried out in 510. The measurement procedure may then be concluded and the method may be ended in 512.

Generally, a respective measurement procedure may be carried out for each frequency band that is supported by the radio transmitter 102.

FIG. 6 shows a flowchart 600 illustrating a method 504 for measuring an output power of a power amplifier circuit and also a value RAMPSCALE for GSM 850 in accordance with one embodiment.

After the measurement procedure has been started in 602, in 604 the radio transmitter may be set for radio signal transmission in accordance with GSM 850 in the frequency band around 850 MHz.

In 606, a GMSK burst may then be ramped up with an output power in accordance with the above table (therein for example with an output power in accordance with a VRAMP value of 600).

The digitized value of the output voltage of the power amplifier circuit 204 as determined by the analogue/digital converter 260 may then be buffer-stored in an output voltage register in 608.

In one embodiment, at a predetermined time interval (which should be large enough such that the analogue/digital converter 260 can determine a change in the output voltage and buffer-store it in the output voltage register), the output voltage register may be read repeatedly and a statistical average value of the values read out from the output voltage register may be determined as average output voltage of the power amplifier circuit 204 in 610.

Then, in 612, the output power $P_{OUT}$ may be measured by means of a power measuring device, for example by means of the measuring device 106, and stored.

There is then a wait until the end of the GMSK burst.

The transmitter may subsequently be ramped down in 614.

In one embodiment, the method may then be repeated for a predetermined number of repetitions (for example six times), in each case with different VRAMP values as presented for example in the above table for GSM 850. The fact of whether or not the method is intended to be carried out again starting from procedure 606 may be determined in 616.

If the method is not intended to be carried out again, then the measurement procedure for GSM 850 may be ended in 618.

The measurement procedure may subsequently be started for the next frequency band supported, for example for GSM 900.

FIG. 7 shows a flowchart 700 illustrating a method 506 for measuring an output power of a power amplifier circuit and also a value RAMPSCALE for GSM 900 in accordance with one embodiment.

After the measurement procedure has been started in 702, in 704 the radio transmitter may be set for radio signal transmission in accordance with GSM 900 in the frequency band around 900 MHz.

In 706, a GMSK burst may then be ramped up with an output power in accordance with the above table (therein for example with an output power in accordance with a VRAMP value of 590).

The digitized value of the output voltage of the power amplifier circuit 204 as determined by the analogue/digital converter 260 may then be buffer-stored in an output voltage register in 708.

In one embodiment, at a predetermined time interval (which should be large enough such that the analogue/digital converter 260 can determine a change in the output voltage and buffer-store it in the output voltage register), the output voltage register may be read repeatedly and a statistical average value of the values read out from the output voltage register may be determined as average output voltage of the power amplifier circuit 204 in 710.

Then, in 712, the output power $P_{OUT}$ may be measured by means of a power measuring device, for example by means of the measuring device 106, and stored.

There is then a wait until the end of the GMSK burst.

The transmitter may subsequently be ramped down in 714.

In one embodiment, the method may then be repeated for a predetermined number of repetitions (for example six times), in each case with different VRAMP values as presented for example in the above table for GSM 900. The fact of whether or not the method is intended to be carried out again starting from procedure 706 is determined in 716.

If the method is not intended to be carried out again, then the measurement procedure for GSM 900 may be ended in 718.

The measurement procedure may subsequently be started for the next frequency band supported, for example for DCS 1800.

FIG. 8 shows a flowchart 800 illustrating a method 508 for measuring an output power of a power amplifier circuit and also a value RAMPSCALE for DCS 1800 in accordance with one embodiment.

After the measurement procedure has been started in 802, in 804 the radio transmitter may be set for radio signal transmission in accordance with DCS 1800 in the frequency band around 1800 MHz.

In 806, a GMSK burst may then be ramped up with an output power in accordance with the above table (therein for example with an output power in accordance with a VRAMP value of 623).

The digitized value of the output voltage of the power amplifier circuit 204 as determined by the analogue/digital converter 260 may then be buffer-stored in an output voltage register in 808.

In one embodiment, at a predetermined time interval (which should be large enough such that the analogue/digital converter 260 can determine a change in the output voltage and buffer-store it in the output voltage register), the output voltage register may be read repeatedly and a statistical average value of the values read out from the output voltage register may be determined as average output voltage of the power amplifier circuit 204 in 810.

Then, in 812, the output power $P_{OUT}$ may be measured by means of a power measuring device, for example by means of the measuring device 106, and stored. There is then a wait until the end of the GMSK burst.

The transmitter may subsequently be ramped down in 814.

In one embodiment, the method may then be repeated for a predetermined number of repetitions (for example six times), in each case with different VRAMP values as presented for example in the above table for DCS 1800. The fact of whether or not the method is intended to be carried out again starting from procedure 806 may be determined in 816.

If the method is not intended to be carried out again, then the measurement procedure for DCS 1800 may be ended in 818.

The measurement procedure may subsequently be started for the next frequency band supported, for example for PCS 1900.

FIG. 9 shows a flowchart 900 illustrating a method 510 for measuring an output power of a power amplifier circuit and also a value RAMPSCALE for PCS 1900 in accordance with one embodiment.

After the measurement procedure has been started in 902, in 904 the radio transmitter may be set for radio signal transmission in accordance with PCS 1900 in the frequency band around 1900 MHz.

In 906, a GMSK burst may then be ramped up with an output power in accordance with the above table (therein for example with an output power in accordance with a VRAMP value of 595).

The digitized value of the output voltage of the power amplifier circuit 204 as determined by the analogue/digital converter 260 may then be buffer-stored in an output voltage register in 908.

In one embodiment, at a predetermined time interval (which should be large enough such that the analogue/digital converter 260 can determine a change in the output voltage and buffer-store it in the output voltage register), the output voltage register may be read repeatedly and a statistical average value of the values read out from the output voltage register may be determined as average output voltage of the power amplifier circuit 204 in 910.

Then, in 912, the output power $P_{OUT}$ may be measured by means of a power measuring device, for example by means of the measuring device 106, and stored.

There is then a wait until the end of the GMSK burst.

The transmitter may subsequently be ramped down in 914.

In one embodiment, the method may then be repeated for a predetermined number of repetitions (for example six times), in each case with different VRAMP values as presented for example in the above table for PCS 1900. The fact of whether or not the method is intended to be carried out again starting from procedure 906 may be determined in 916.

If the method is not intended to be carried out again, then the measurement procedure for PCS 1900 may be ended in 918.

Afterward, the radio transmitter 102 switches to a quiescent state and the method may be ended in 512.

The measured values for RAMPSCALE and for the output power $P_{OUT}$ are now present and can be used for determining corresponding calibration characteristic curves for the radio transmitter 102. In one embodiment, it is also possible to perform an interpolation of the measured values when determining the calibration characteristic curves for the radio transmitter 102.

By way of example, the corresponding control loop gain values can also be determined from the characteristic curves determined.

In accordance with various embodiments, a calibration algorithm is provided, with an open control loop in the radio transmitter. This enables a user to carry out a very fast calibration which involves measuring not only backward path characteristic quantities (such as, for example, a mapping of the output power onto the digitized output voltage of the power amplifier) but also control characteristic quantities, to put it another way forward path characteristic quantities (such as, for example, a mapping of the control voltage VRAMP of the power amplifier onto the output power of the power amplifier). With the availability of the control characteristic quantities of the power amplifier, it is possible, for example, to adapt or calibrate the gain of the entire control loop of the automatic power control, thereby achieving a stabilization of the performance of the radio transmitters in the context of mass production.

It should be pointed out that in one embodiment a fully digital control loop is taken into consideration in the context of the calibration.

During conventional operation with a closed control loop, the relationship between the output voltage determined and the output power may be determined by running the closed control loop with a predetermined desired output voltage and measuring the output power.

In accordance with various embodiments, by contrast, the power amplifier is brought to a specific operating point by setting a specific VRAMP voltage. The output power POUT is then measured, for example by means of the measuring device 106, for example a power measuring device or a communication tester such as, for example, the CMU 200.

In addition, the output voltage $V_{DET}$ may be digitized and read back into the programming device, for example the digital controller 268, whereby the complete characteristic curve $V_{RAMP} \rightarrow P_{OUT} \rightarrow V_{DET}$ can be determined.

Clearly, one embodiment provides an automatic power control system (APC system) having a closed control loop, which system is configured in such a way that it is possible to operate it for calibration in a mode with an open control loop.

One embodiment enables a user to obtain additional information for example about a power amplifier circuit to be tested in a radio transmitter, wherein, at the same time at which the customary calibration is effected, the relationship between the voltage VRAMP and the output power $P_{OUT}$ (function VRAMP→$P_{OUT}$) is obtainable for the calibration software.

An alternative embodiment likewise provides for obtaining the additional information both about forward path characteristic quantities and about backward path characteristic quantities themselves in a mode in which the radio transmitter operates or is operated in a closed control loop (by way of example, it is possible to provide a calibration with a closed control loop wherein VRAMP is determined and/or monitored).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for calibrating a transmitter having a transmitter control loop, the method comprising:
    inputting an electrical quantity into the transmitter;
    measuring at least one forward path characteristic quantity of the transmitter control loop which is dependent on the electrical quantity input;
    measuring at least one backward path characteristic quantity of the transmitter control loop which is dependent on the electrical quantity input; and
    calibrating the transmitter depending on the at least one forward path characteristic quantity measured and the at least one backward path characteristic quantity measured;
    wherein the transmitter control loop is opened during the measurement of the forward path characteristic quantity and the backward path characteristic quantity.

2. The method as claimed in claim 1,
    wherein the electrical quantity is an electrical voltage.

3. The method as claimed in claim 1,
    wherein the transmitter comprises an amplifier circuit configured to amplify a transmission signal to be transmitted;
    wherein the electrical quantity is fed to the amplifier circuit;
    wherein a quantity representing a transmitter control loop response threshold voltage of the amplifier circuit is measured as the backward path characteristic quantity.

4. The method as claimed in claim 1,
    wherein the measured backward path characteristic quantity of the transmitter control loop is digitized to form a digital backward path characteristic quantity of the transmitter control loop.

5. The method as claimed in claim 1,
    wherein the transmitter is a mobile radio transmitter.

6. A method for calibrating a electronic circuit having a control loop, the method comprising:
    inputting an electrical quantity into the electronic circuit;
    measuring at least one forward path characteristic quantity of the control loop which is dependent on the electrical quantity input;
    measuring at least one backward path characteristic quantity of the control loop which is dependent on the electrical quantity input; and
    calibrating the electronic circuit depending on the at least one forward path characteristic quantity measured and the at least one backward path characteristic quantity measured;
    wherein the control loop is opened during the measurement of the forward path characteristic quantity and the backward path characteristic quantity.

7. The method as claimed in claim 6,
    wherein the electrical quantity is derived from a digital value which is input and which represents the electrical quantity.

8. The method as claimed in claim 6,
    wherein the measured backward path characteristic quantity of the control loop is digitized to form a digital backward path characteristic quantity of the control loop.

9. A radio transmitter, comprising:
    a radio transmitter control loop;
    a controller configured in such a way that it operates the radio transmitter control loop as a closed control loop in a first operating mode, and that it operates the radio transmitter control loop as an open control loop in a second operating mode, wherein the second operating mode is for only calibrating the radio transmitter;
    an amplifier circuit configured to amplify a radio signal to be transmitted; and
    a modulator configured to modulate the radio signal to be transmitted to form a modulated radio signal, wherein the modulator is connected to a first input of the amplifier circuit such that the modulated radio signal to be transmitted can be fed to the amplifier circuit;
    wherein the radio transmitter control loop comprises:
        a forward path, wherein the forward path comprises a digital/analogue converter, the input of which is configured to receive a digital value representing a radio transmitter control voltage, wherein the radio transmitter control voltage is provided at an output of the digital/analogue converter, wherein the output of the digital/analogue converter is connected to a second input of the amplifier circuit, such that the radio transmitter control voltage can be fed to the amplifier circuit.

10. The radio transmitter as claimed in claim 9, further comprising:
    an amplifier circuit configured to amplify a radio signal to be transmitted.

11. The radio transmitter as claimed in claim 9, further comprising:
a ramp voltage value generator configured to generate a ramp voltage value for controlling the radio transmitter.

12. The radio transmitter as claimed in claim 10,
wherein a first output of the ramp voltage value generator is connected to the input of the digital/analogue converter, such that the ramp voltage value can be received as the digital value by the digital/analogue converter.

13. The radio transmitter as claimed in claim 10,
wherein the radio transmitter control loop comprises a backward path; and
wherein the backward path comprises an analogue/digital converter, the input of which is connected to an output of the amplifier circuit and which is configured to receive an output voltage of the amplifier circuit, wherein a digitized output voltage of the amplifier circuit is provided at an output of the analogue/digital converter.

14. The radio transmitter as claimed in claim 13,
wherein the output of the analogue/digital converter is connected to an input of the controller, such that the digitized output voltage of the amplifier circuit can be fed to the controller.

15. The radio transmitter as claimed in claim 11,
wherein a second output of the ramp voltage value generator is connected to the input of the controller, such that a quantity representing the ramp voltage value can be received by the controller.

16. The radio transmitter as claimed in claim 9, further comprising:
a memory configured to store at least one calibration value determined in the second operating mode.

17. The radio transmitter as claimed in claim 9,
wherein the radio transmitter is a mobile radio transmitter.

18. A communication device comprising:
a radio transmitter, comprising:
a radio transmitter control loop; and
a controller configured in such a way that it operates the radio transmitter control loop as a closed control loop in a first operating mode, and that it operates the radio transmitter control loop as an open control loop in a second operating mode, wherein the second operating mode is for only calibrating the radio transmitter;
an amplifier circuit configured to amplify a radio signal to be transmitted; and
a modulator configured to modulate the radio signal to be transmitted to form a modulated radio signal, wherein the modulator is connected to a first input of the amplifier circuit such that the modulated radio signal to be transmitted can be fed to the amplifier circuit;
wherein the radio transmitter control loop comprises:
a forward path, wherein the forward path comprises a digital/analogue converter, the input of which is configured to receive a digital value representing a radio transmitter control voltage, wherein the radio transmitter control voltage is provided at an output of the digital/analogue converter, wherein the output of the digital/analogue converter is connected to a second input of the amplifier circuit, such that the radio transmitter control voltage can be fed to the amplifier circuit.

* * * * *